United States Patent [19]

Kiovsky

[11] 4,169,063

[45] Sep. 25, 1979

[54] EPR DISPERSANT VI IMPROVER

[75] Inventor: Thomas E. Kiovsky, Houston, Tex.

[73] Assignee: Shell Oil Company, Houston, Tex.

[21] Appl. No.: 776,573

[22] Filed: Mar. 11, 1977

[51] Int. Cl.² .............................................. C10M 1/32
[52] U.S. Cl. ........................ 252/51.5 A; 260/326.5 F; 260/326.5 FM
[58] Field of Search ................................. 252/51.5 A

[56] References Cited

U.S. PATENT DOCUMENTS

| | | | |
|---|---|---|---|
| 3,769,216 | 10/1973 | Gordon et al. | 252/51.5 A X |
| 3,864,268 | 2/1975 | Culbertson et al. | 252/51.5 A X |
| 3,868,330 | 2/1975 | Meinhardt et al. | 252/51.5 A X |
| 3,956,149 | 5/1976 | Coleman | 252/51.5 A |

*Primary Examiner*—Paul F. Shaver
*Attorney, Agent, or Firm*—Dean F. Vance

[57] ABSTRACT

Lubricating oil additives having both dispersant and viscosity-index improving properties are prepared by reacting an ethylene-propylene copolymer with chlorine and/or an alpha-beta unsaturated dicarboxylic acid or derivative, and then reacting the resulting intermediate with certain amines.

8 Claims, No Drawings

EPR DISPERSANT VI IMPROVER

BACKGROUND OF THE INVENTION

The newer engines place increased demands on the lubricants to be employed. In the past, a number of different additives have been added to lubricating oils to improve such properties as viscosity index and dispersancy. Significant reductions in cost can be made by employing a single additive that improves a number of lubricant properties. However, in attempting to improve more than a single lubricant property, care must be taken in not causing the deterioration of other properties. For example, in U.S. Pat. Nos. 3,687,905 and 3,864,268, copolymers of ethylene and propylene are first oxidized and degraded prior to an aminitation. This procedure results in the introduction of sites for future oxidative attack.

Significantly, known processes for making certain dispersants are not always applicable for the preparation of dispersants also having viscosity index-improving properties. For example, in U.S. Pat. No. 3,172,892, a relatively low molecular weight polymer (having about 50 carbon atoms) is reacted with maleic anhydride and an ethylene amine to form a dispersant; but, the reaction mechanism relies upon the presence of a single double bond that is inherently present at the end of the olefin polymer. When the polymer has only 50 carbon atoms, sufficient dispersancy sites may be available through the single terminal double bond. However, when the polymer has over 500 carbon atoms, such as is necessary for it to impart some viscosity index-improving properties, the single terminal double bond will not be sufficient, and a difficult derivitization means is required in order to obtain adequate dispersancy.

In addition, it is important that the polymer dispersant-VI improver have a sufficient number and type of sites with dispersant activity. Therefore, additives such as those disclosed in U.S. Pat. No. 3,454,607, prepared with mono-carboxylic acid-producing compounds may be deficient.

A new additive has been prepared that is not oxidatively degraded prior to derivitization. In addition, the preparation process for the new additive is not dependent upon the presence of double bonds in the polymer chain in order to provide reaction sites. Further, the new additive possesses good dispersancy characteristics in addition to good viscosity index-improving characteristics.

SUMMARY OF THE INVENTION

Ashless, oil-soluble additives having both dispersant and viscosity-index (VI) improving properties are prepared by the process comprising:

(a) reacting a high molecular weight amorphous copolymer of essentially ethylene and propylene, said copolymer having a number average molecular weight of between about 70,000 and about 300,000, with an alpha-beta unsaturated dicarboxylic acid, anhydride or ester at a temperature of between about 150° C. and about 250° C. for between about 6 hours and about 24 hours, thereby forming a modified polymer; and (b) reacting said modified polymer with a $C_1$ to $C_{18}$ amine containing 1 to 8 nitrogen atoms at a temperature of between about 150° C. and about 250° C. Alternatively, the essentially ethylene-propylene copolymer is reacted with chlorine and the alpha-beta unsaturated dicarboxylic compound prior to imidization with the amine. This chlorination is radical chlorination as opposed to ionic chlorination, and is not dependent upon the presence of double bonds in the polymer backbone. The chlorination may take place prior to the addition of the dicarboxylic compound or at the same time. Further, while the chlorination may take place in the presence of radical initiators and/or ultra violet radiation, their presence is not absolutely necessary, and the radical chlorination may be initiated by heat alone.

DETAILED DESCRIPTION OF THE INVENTION

The copolymers employed herein refer to amorphous copolymers derived essentially from ethylene and propylene, however, such copolymers may contain minor amounts, i.e. up to 10 percent, based on the molar amounts of the monomeric ethylene and propylene units in the copolymer, of polymerized units derived from other olefin monomers. Such other olefin monomers include olefins of the general formula $RCH=CH_2$, in which R is an aliphatic or cycloaliphatic radical of from 2 to about 20 carbon atoms, for example, butene-1, hexene-1, 4-methyl-1-pentene, decene-1, etc.

Suitable ethylene-propylene copolymers contain from about 30 to about 65, preferably from about 35 to about 45 mole percent propylene, and have a number average molecular weight of between about 70,000 and about 300,000, preferably between about 80,000 and about 200,000. It is also preferred that the ethylene-propylene copolymer contain at least 150 pendant methyl groups per 1,000 chain carbon atoms. Methods of preparation of these copolymers are well known, and are described in the United States Patents listed in U.S. Pat. No. 3,864,268.

The ethylene-propylene copolymer is first reacted with a dicarboxylic compound, in particular an alpha-beta ethylenically unsaturated dicarboxylic acid or its anhydride or ester derivatives. Suitable unsaturated acids and derivatives include maleic acid, maleic anhydride, dimethyl- and diethylmaleate, itaconic acid, dimethyl itaconate, methyl maleic anhydride, citraconic anhydride, and the like. Maleic anhydride is especially preferred.

The dicarboxylic compound and the ethylene-propylene copolymer are reacted together at a temperature of between about 150° C. and about 250° C., preferably between about 180° C. and about 230° C. The contacting time is between about 6 hours and about 24 hours, preferably between about 8 hours and about 16 hours. It is significant that the carboxylic groups are attached to the essentially saturated ethylene-propylene copolymer all along the polymer chain instead of only at the terminal double bond location as in the prior art. The process according to the prior art would not result in the attachment of sufficient carboxylic groups on the polymer chain to permit the attainment of sufficient dispersancy activity.

Various solvents may be employed in the carboxylic acid derivative addition step including generally olefin-free petroleum hydrocarbons, aromatics and halogenated hydrocarbons. A preferred solvent is a lubricating oil basestock. A much preferred solvent is trichlorobenzene. Preferably, a concentration in the range of about 1 to about 10 percent by weight of the copolymer in solvent may conveniently be used for this conversion.

The amount of dicarboxylic compound employed to react with the ethylene-propylene copolymer varies from about 5 to about 25 percent by weight, preferably about 8 to about 15 percent by weight based on the weight of the copolymer.

In a preferred embodiment, the ethylene-propylene copolymer is chlorinated either prior to reaction with the dicarboxylic compound or at the same time. Preferably, the chlorination takes place prior to reaction with the $\alpha,\beta$-unsaturated acid or acid derivative. This chlorination is radical chlorination as opposed to ionic chlorination since ionic chlorination requires the presence of double bonds. The radical chlorination may take place in the presence of radical initiators such as azobisisobutyronitrile, tert-butylhydroperoxide, dibenzoyl peroxide and the like, or in the presence of ultraviolet radiation, however, this is not absolutely necessary, and radical chlorination may take place at temperatures above about 30° C. Radical chlorination is discussed in Makowski et al, "Readily Curable Chlorinated Poly-$\alpha$-olefins and Ethylene-$\alpha$-olefin Copolymers", I & EC Product Research and Development, Volume 3, No. 4 pages 282–291 (December 1964). The amount of chlorine employed is typically between about 1 percent by weight and about 20 percent by weight, preferably between about 5 and about 15 percent by weight based on the weight of the ethylene-propylene copolymer. Chlorination conditions include temperatures of between about 0° C. and about 100° C., preferably between about 25° C. and about 60° C., and contact times of between about 0.1 hours and about 2 hours.

The modified polymer is then reacted with an amine to form the oil-soluble product of the instant invention. The resulting imides of succinic acid and the like provide the dispersant function of the additive.

The $C_1$ to $C_{18}$ amines employed in the instant invention can be branched or unbranched, saturated, aliphatic, primary or secondary amines, containing 1 to 8 nitrogens, preferably mono or diamines, such as ethyl amine, butylamine, sec. butylamine, diethylamine, etc., but including higher polyamines such as alkylene polyamines, wherein pairs of nitrogen atoms are joined by alkylene groups of 2 to 4 carbon atoms. Thus, polyamines of the formula:

$$NH_2(CH_2)_n-[NH(CH_2)_n]_m-NH_2$$

are included where n is 2 to 4 and m is 0 to 6. Examples of such polyamines include tetraethylene pentamine, tripropylene tetramine, N-aminoalkyl piperazines, e.g., N-(2-aminoethyl) piperazine, N,N'-di(2-aminoethyl) piperazine, etc. Preferred is tetraethylene pentamine, as well as corresponding commercial mixtures such as "Polyamine H", and "Polyamine 500".

The molar ratio of amine to dicarboxylic compound is typically between about 0.1:1 and about 2:1, preferably between about 0.5:1 and about 2:1, most preferably about 1:1. The conditions during imidization are typically about 150° to 250° C. for between about 1 hour and about 20 hours.

In both reaction steps it is much preferred that the reactions take place in the absence of oxygen. A nitrogen blanket is often used to accomplish this result. The reason for performing the reaction in the absence of oxygen is that the resulting additive may be more oxidatively unstable if any oxygen is present during the formation of the additive.

If excess amine is employed, then it may be desirable to remove the excess. One means of doing this is to first add a volume of heptane equal to the volume of dissolved additive. Then an equal volume of methanol is added. Two separate layers are therein formed; one layer comprising predominantly methanol and the unreacted amine and a second layer comprising predominantly heptane, the solvent and the additive product. After separating the methanol layer, the volatiles present in the other layer can then be removed by a distillation technique. Alternatively the excess amine may be removed under a vacuum or with a stripping gas stream.

If the ethylene-propylene copolymer originally employed had a sufficiently low molecular weight, e.g. between about 70,000 and about 300,000, then the final additive product should have sufficient viscosity-index improving properties. However, it is possible to prepare the instant additive product starting with a copolymer having a high molecular weight between about 300,000 and about 1,000,000. When employing the higher molecular weight copolymer, it is necessary to subject the resulting higher molecular weight additive product to a shearing condition in order to reduce the molecular weight of the additive to the desired molecular weight. One shearing mechanism involves adding a solvent such as heptane to the additive product in order to reduce the viscosity, and then pumping the solution through a Diesel injection nozzle at high pressures, such as above about 1000 psig. Other high shear devices include high shear mixers and pumps such as a gear pump. The molecular weight of the resulting polymer can be controlled by varying the number of times that the solution is pumped through the nozzle or high shear device. In addition to reducing the molecular weight of the additive product to within the desired range, shearing also narrows the molecular weight distribution since bigger molecules are sheared more readily than smaller molecules. This narrower molecular weight distribution is advantageous since it results in greater stability in the engine. It is preferred that the ratio of $M_w/M_n$ be between about 1 and about 4 where $M_w$ is the weight average molecular weight and $M_n$ is the number average molecular weight.

The reaction product of this invention can be incorporated in lubricating oil compositions, e.g., automotive crankcase oils, in concentrations within the range of about 0.1 to about 15, preferably about 0.1 to 3, weight percent based on the weight of the total compositions. The lubricating oils to which the additives of the invention can be added include not only mineral lubricating oils, but synthetic oils also. Synthetic hydrocarbon lubricating oils may also be employed, as well as non-hydrocarbon synthetic oils including dibasic acid esters such as di-2-ethyl hexyl sebacate, carbonate esters, phosphate esters, halogenated hydrocarbons, polysilicones, polyglycols, glycol esters such as $C_{13}$ oxo acid diesters of tetraethylene glycol, etc. When used in gasoline or fuel oil, e.g., Diesel fuel, No. 2 fuel oil, etc., then usually about 0.001 to 0.5 wt. percent, based on the weight of the total composition of the reaction product will be used. Concentrates comprising a minor proportion, e.g., 5 to 45 wt. percent, of said reaction product in a major amount of hydrocarbon diluent, e.g., 95 to 55 wt. percent mineral lubricating oil, with or without other additives present, can also be prepared for ease of handling.

In the above compositions or concentrates, other conventional additives may also be present, including dyes, pour point depressants, antiwear agents, e.g., tricresyl phosphate, zinc dialkyl dithiophosphates of 3 to 8 carbon atoms, antioxidants such as phenyl-alpha-naphthylamine, tert. octylphenol sulfide, bis-phenols such as 4,4'-methylene bis(3,6-di-tert. butylphenol), viscosity index improvers such as the ethylene-higher olefin copolymer, polymethylacrylates, polyisobutylene, alkyl fumarate-vinyl acetate copolymers, and the like as well as other ashless dispersants or detergents such as overbased sulfonates.

The invention is further illustrated by means of the following illustrative embodiments, which are given for the purpose of illustration alone and are not meant to limit the invention to the particular reactants and amounts disclosed.

ILLUSTRATIVE EMBODIMENT I

In Illustrative Embodiment I, an excellent dispersant-VI improver was prepared according to the process of the invention. The base polymer employed was EPcar® 506 from B. F. Goodrich. EPcar® 506 is an essentially saturated (0.04 milliequivalents of unsaturation per gram polymer by ozone titration) ethylene-propylene copolymer having a number average molecular weight of about 121,000 and a weight average molecular weight of about 202,000. The polymer contains about 62 mole percent ethylene.

To make the additive, 415 grams (g) of EPcar® 506 was ground into crumbs and dissolved in 7.4 liters of a lube base stock. To this solution was added 33.2 g of maleic anhydride and the mixture heated to 225° C. for eight hours. Unreacted maleic anhydride was then removed by vacuum distillation.

After cooling to 140° C., 52 g of tetraethylene-pentamine was added and the mixture heated to 160° C. for one hour and 180°-190° C. for two hours. After cooling, the mixture was diluted with an equal volume of heptane and the mixture pumped through a Manton-Gaulin Type 15M 8TBA homogenizer until the viscosity of the heptane-free solution had decreased by about 30%.

The sheared solution was then filtered, washed with methanol and stripped of volatiles. The final product was 6200g of an oil solution containing 6.7% w active material.

Dispersancy of the product was assessed by a Spot Dispersancy Test. In the Spot Dispersancy Test, one part of a 2% weight polymer solution in 100 N oil is mixed with two parts used, sludge-containing oil and heated overnight at 150° C. Blotter spots are then made on filter paper and the ratio of sludge spot diameter to oil spot diameter is measured after 24 hours. A poor value is under about 50% and a good value is 60% or greater. The additive prepared above yielded a value of 64%. Unmodified starting material (EPcar® 506) gave a value of about 30%.

A fully formulated oil containing two percent of the product and a commercially-used detergent inhibitor package met 10W/50 viscosity requirements.

ILLUSTRATIVE EMBODIMENT II

Another oil-soluble dispersant - VI improver was prepared by first reacting the ethylene-propylene copolymer with chlorine, and then with maleic anhydride and tetraethylene pentamine.

About 20 grams of EPcar® 506 was dissolved in 380 g carbon tetrachloride (CCl4). A solution of one gram of chlorine in 13 ml of CCl4 was added at room temperature. The mixture was then heated to 50° C. for one hour. After one hour unreacted chlorine and HCl produced in the reaction was stripped with a nitrogen stream.

After stripping, 350 g of a standard lube base stock was added and the CCl4 distilled. Two grams of recrystallized maleic anhydride were added and the mixture heated to 180°-200° C. for two hours. Excess maleic anhydride was then removed by application of vacuum.

After cooling to 120° C., 2.5 g tetraethylene pentamine was added and the mixture heated to 160° C. for one hour then to 190° C. for two hours. The solution was then cooled and diluted with an equal volume of heptane. A nitrogen atmosphere was maintained during all high temperature reaction steps.

After diluting with heptane, the solution was run through a Manton-Gaulin homogenizer Type 15M 8TBA three times to reduce the molecular weight and narrow the molecular weight distribution.

The solution was then filtered, washed with methanol and stripped of volatiles.

The final product had good dispersancy as illustrated by a Spot Dispersancy Test value of 67%.

Thickening power of the dispersant-VI improver was demonstrated by the fact that 2% by weight of the polymer product increased the kinematic viscosity at 210° F. of a lube base stock from 4 centistokes to 16 centistokes.

ILLUSTRATIVE EMBODIMENT III

Illustrative Embodiment II was essentially repeated, except that EPcar® 4604-166 was employed as the base polymer instead of EPcar® 506. EPcar® 4604-166 is an essentially saturated ethylene-propylene copolymer having a number average molecular weight of about 96,000 and a weight average molecular weight of about 172,000. The polymer contains about 65 mole percent ethylene.

The resulting polymer additive had a Spot Dispersancy Test value of about 61%.

What is claimed is:

1. The oil-soluble product prepared by the process comprising:
   (a) reacting a high molecular weight amorphous copolymer of essentially ethylene and propylene, said copolymer having a number average molecular weight of between about 70,000 and about 300,000, with an alpha-beta unsaturated dicarboxylic acid, anhydride or ester in the absence of oxygen and chlorine at a temperature of between about 150° C. and about 250° C. for between about 6 hours and about 24 hours; and
   (b) reacting the product of step (a) with a $C_1$ to $C_{18}$ amine containing 1 to 8 nitrogen atoms at a temperature of between about 150° C. and about 250° C.

2. The composition of claim 1 wherein said amorphous copolymer comprises essentially ethylene, from 30 to about 65 mole percent propylene, and less than about 10 mole percent of an alpha-olefin of the general formula $RCH{=}CH_2$, where R is an aliphatic or cycloaliphatic radical of from 2 to about 20 carbon atoms.

3. The composition of claim 1 wherein said alpha-beta unsaturated dicarboxylic acid, anhydride or ester is maleic anhydride.

4. The composition of claim 3 wherein said amine has the formula:

$$NH_2(CH_2)_{\overline{n}}[NH(CH_2)_{\overline{n}}]_{\overline{m}}NH_2$$

where n is 2 to 4 and m is 0 to 6, and the molar ratio of amine to maleic anhydride is between about 0.5:1 and about 2:1.

5. The composition of claim 4 wherein the amine is tetraethylene pentamine.

6. The composition of claim 1 wherein said amorphous copolymer and said alpha-beta unsaturated dicarboxylic acid, anhydride or ester are reacted in the presence of a solvent, and wherein the amount of said alpha-beta unsaturated dicarboxylic compound is between about 5 weight percent and about 25 weight percent, based on the weight of the amorphous copolymer.

7. The oil-soluble product prepared by the process comprising:

(f) reacting a high molecular weight amorphous copolymer of essentially ethylene and propylene, said copolymer having a number average molecular weight of between about 300,000 and about 1,000,000, with an alpha-beta unsaturated dicarboxylic acid, anhydride or ester in the absence of oxygen and chlorine at a temperature of between about 150° C. and about 250° C. for between about 150° C. and about 250° C. for between about 6 hours and about 24 hours;

(g) reacting the product of step (f) with a $C_1$ to $C_{18}$ amine containing 1 to 8 nitrogen atoms at a temperature of between about 150° C. and about 250° C.; and (h) subjecting the product of step (g) to a repeated shearing action so as to reduce the molecular weight of the oil-soluble product to between about 80,000 and about 300,000, and the ratio of $M_w/M_n$ to between 1 and 4.

8. A lubricating composition comprising a major amount of a lubricating oil and from 0.1 to about 15.0 weight percent of the oil-soluble product of claim 1.

* * * * *